United States Patent [19]
Reed

[11] 3,955,529
[45] May 11, 1976

[54] AUTOMATIC BREADING MACHINE

[75] Inventor: Buckley R. Reed, Jeffersontown, Ky.

[73] Assignee: Reed & Associates, Inc., Jeffersontown, Ky.

[22] Filed: Aug. 22, 1974

[21] Appl. No.: 499,496

[52] U.S. Cl................................. 118/19; 118/30; 118/603
[51] Int. Cl.².......................................... A23G 3/26
[58] Field of Search ................... 118/19, 28, 30, 56, 118/602, 603, 417, 418

[56] References Cited
UNITED STATES PATENTS

| | | | |
|---|---|---|---|
| 1,819,557 | 8/1931 | Hunter | 118/19 |
| 2,536,662 | 1/1951 | Roth | 118/19 |
| 2,970,563 | 2/1961 | Hunter | 118/19 |
| 3,097,967 | 7/1963 | Fries et al. | 118/19 |
| 3,381,658 | 5/1968 | Porambo | 118/19 |
| 3,608,516 | 9/1971 | Temple | 118/19 |

Primary Examiner—Mervin Stein
Attorney, Agent, or Firm—Victor J. Evans & Co.

[57] ABSTRACT

An automatic breading machine for coating food stuffs with flour, or other dry coating materials which includes an elongate hopper mounted for rotation about its longitudinal axis and having agitator blades for thoroughly moving the food objects within the flour to completely coat the objects. The food objects are ejected from the hopper onto a screen which permits excess dry coating material to drop therethrough. The dry coating material supply normally moves out of the hopper through ports at one end of the hopper and through a screen sifter which separates dough balls from the flour to prevent the dough balls from returning to the system or from being delivered with the food stuffs. The flour passing out of the cylinder is collected in a hopper and conveyed to the intake chute of the hopper for reuse. A pair of flour collecting hoppers and a pair of conveyors are used so as to provide the automatic breading machine with selectivity of flour.

6 Claims, 6 Drawing Figures

AUTOMATIC BREADING MACHINE

BACKGROUND OF THE INVENTION

1. Field of the Invention

The present invention relates to automatic breading machines having an automatic flour return, automatic sifting and removal of the dough balls.

The primary object of the invention is to provide an automatic breading machine in which the flour is reused by conveying to the inlet end of the machine to permit all of the flour to be used up without possible contamination by handling.

Other objects and advantages will become apparent in the following specification when considered in light of the attached drawings.

BRIEF DESCRIPTION OF THE DRAWINGS

FIG. 4 is a fragmentary vertical sectional view taken along the line 4—4 of FIG. 3, looking in the direction of the arrows;

FIG. 5 is a fragmentary horizontal sectional view taken along the line 5—5 of FIG. 4, looking in the direction of the arrows; and FIG. 6 is a horizontal sectional view taken along the line 6—6 of FIG. 2, looking in the direction of the arrows.

DESCRIPTION OF THE PREFERRED EMBODIMENT

Figure 1:
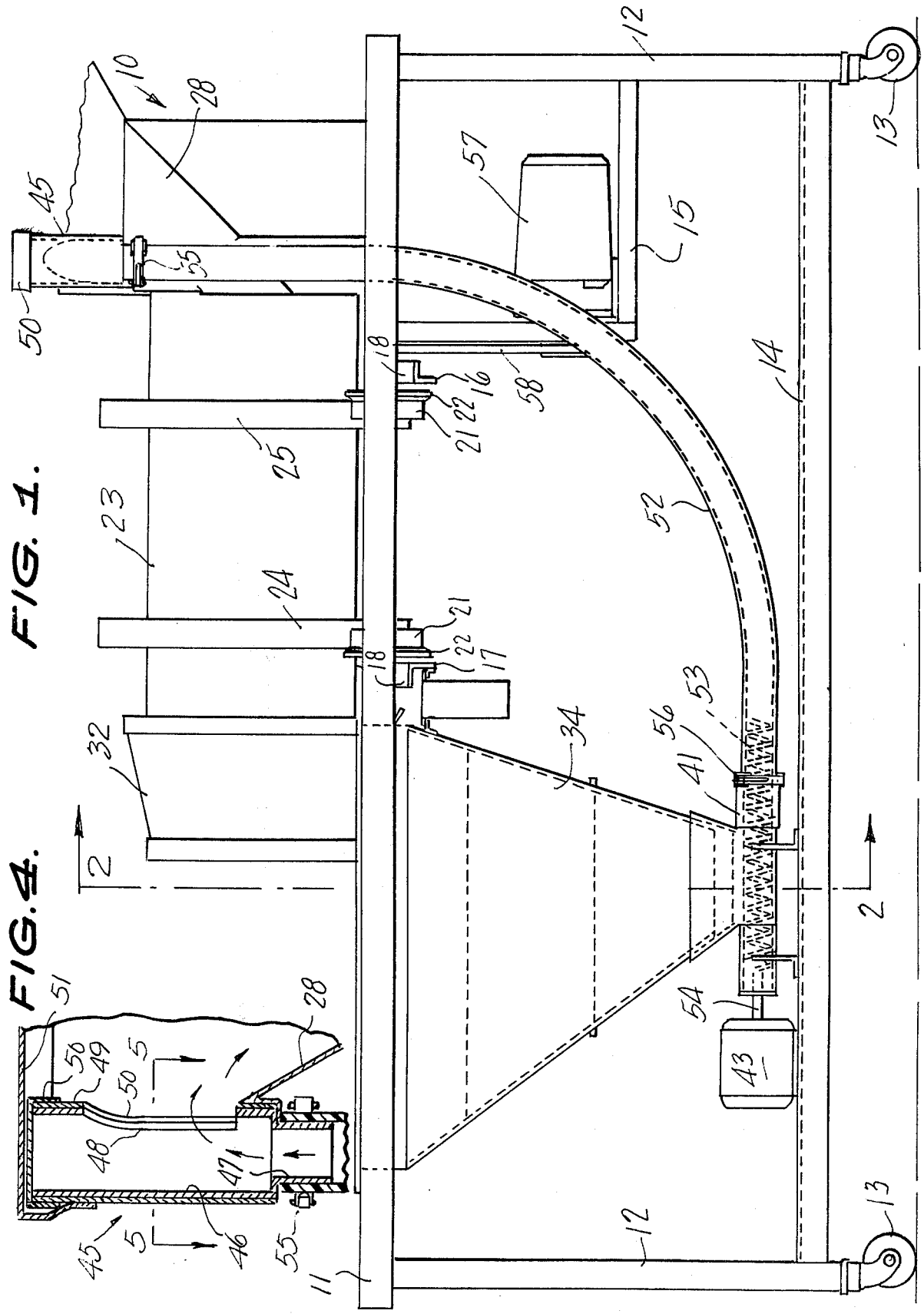
FIG. 1 is a side elevation of the invention.
Figure 2:
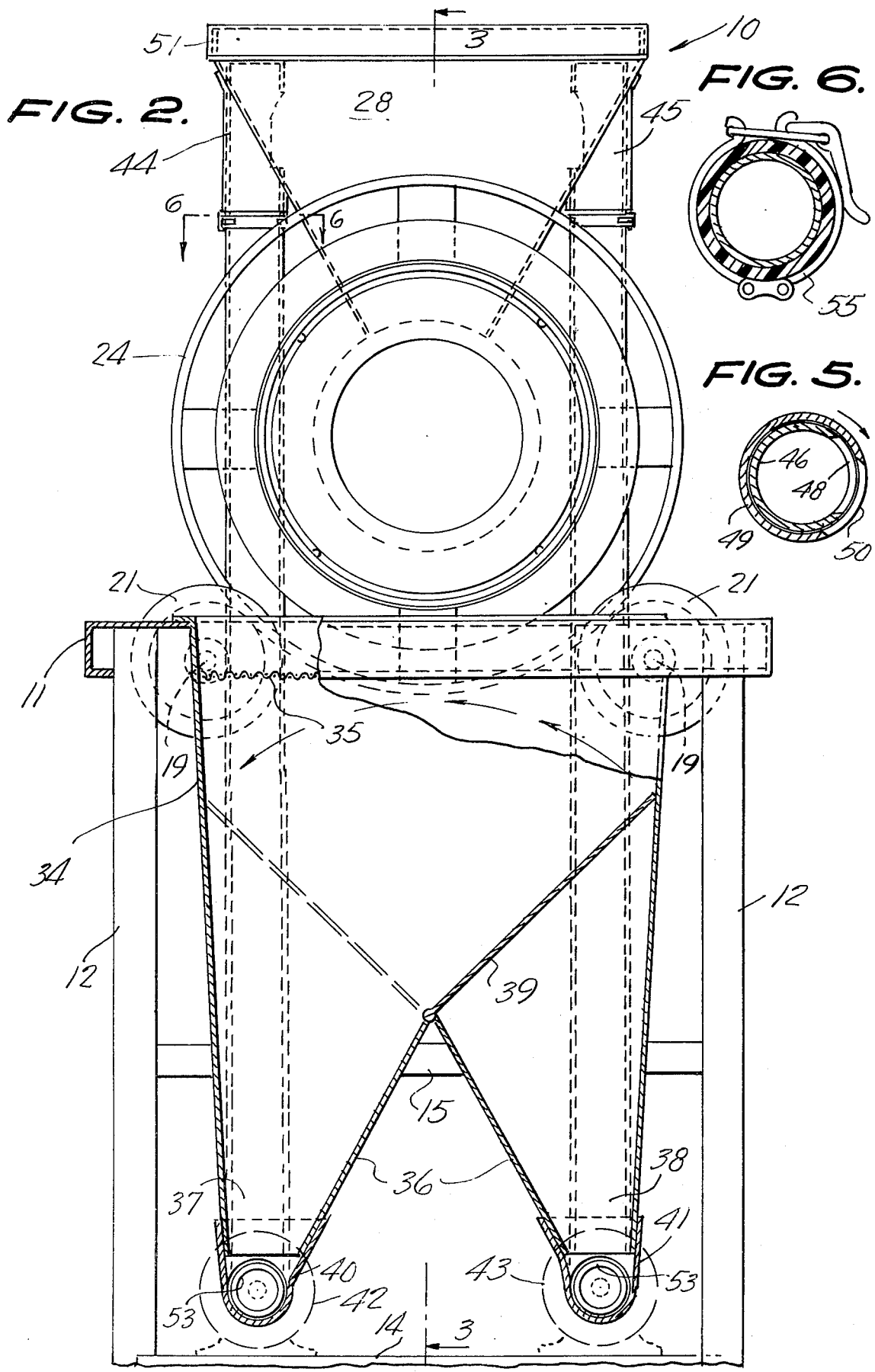
FIG. 2 is a vertical sectional view taken along the line 2—2 of FIG. 1, looking in the direction of the arrows.

Referring now to the drawings in detail wherein like reference characters indicate like parts throughout the several figures, the reference numeral 10 indicates generally an automatic breading machine constructed in accordance with the invention.

The automatic breading machine 10 includes a generally horizontal table 11 supported on legs 12 having casters 13 at the lower end thereof. A platform 14 extends between the legs 12 at a position spaced below the table top 11. A drive motor frame 15 is supported by the table top 11 and the legs 12 at one end of the machine 10. A pair of angle iron frame members 16, 17 extend across the table top 11 and are secured therebeneath by blocks 18. A pair of shafts 19 are mounted in spaced parallel relation on the frame 16, 17 by means of bearing blocks 20. A pair of flanged rubber tread wheels 21 are mounted on each of the shafts 19 with their flanges 22 arranged outermost.

A cylinder 23 is provided with a pair of circular track members 24, 25 arranged in spaced apart parallel relation and resting on the flanged wheels 21 so as to rotate thereon as the flanged wheels 21 are rotated.

An elongate mixing blade 26 extends through the cylinder 23 and is secured to rods 27 extending through the cylinder 23 parallel to the axis and spaced slightly inwardly from the cylinder 23.

A feed chute 28 is supported on a box 29 extending upwardly from the table top 11. The feed chute 28 has a delievery extension 30 which extends through an opening 31 in the intake end of the cylinder 23.

Figure 3:
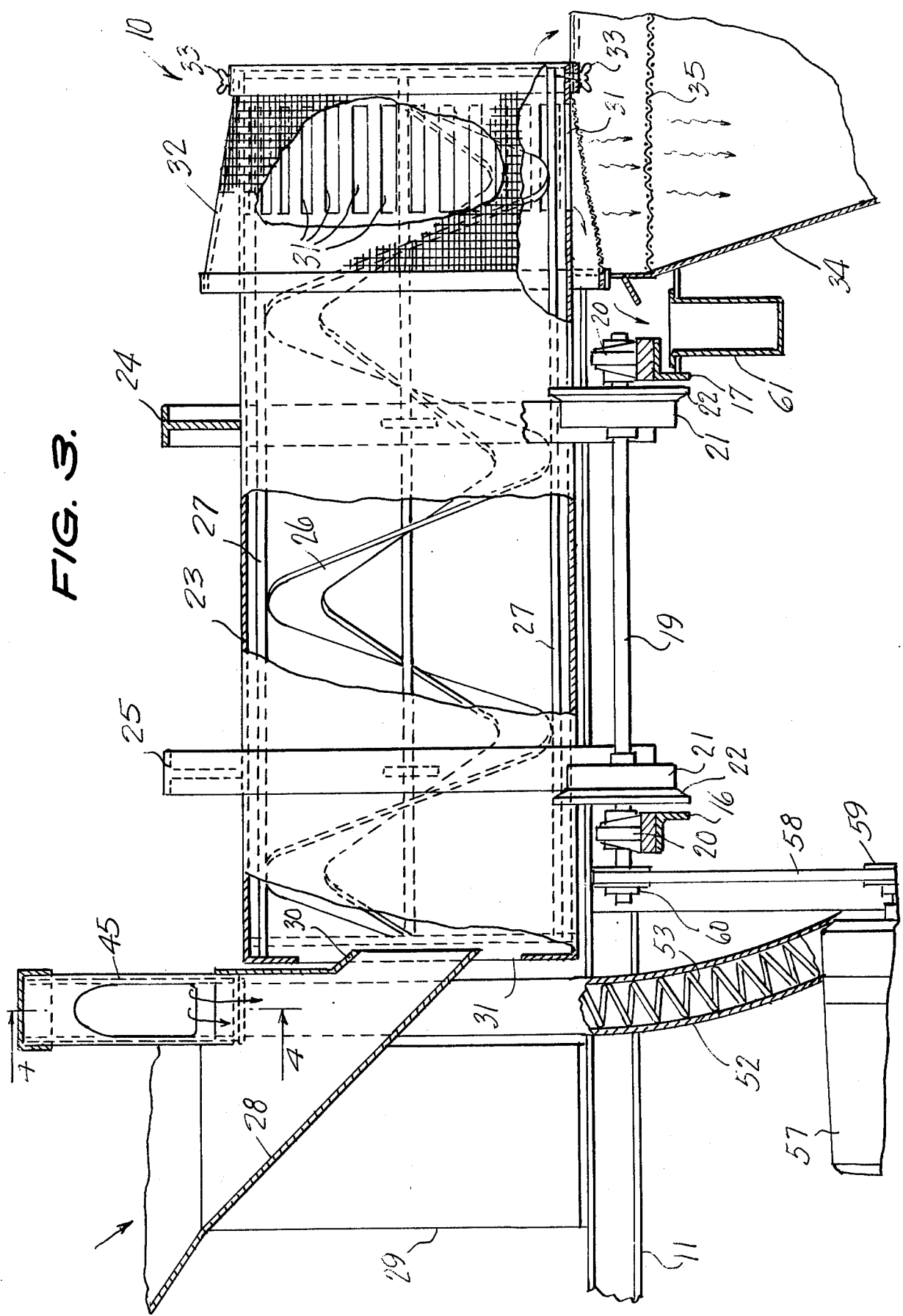
FIG. 3 is a longitudinal sectional view taken along the line 3—3 of FIG. 2, looking in the direction of the arrows with parts broken away for convenience of illustration.

The cylinder 23 has a plurality of elongate slots 31 formed in the outlet end portion thereof arranged in spaced apart parallel relation for reasons to be assigned. A conical sifter screen 32 is detachably secured to the cylinder 23 by wing bolts 33 so that the screen 32 may be easily removed for cleaning. The screen 32 is spaced outwardly from the slots 31 as can be seen in FIG. 3.

A hopper 34 underlies the discharge end of the cylinder 23 and has a screen 35 extending over the top surface thereof to permit flour and other breading materials to fall therethrough while preventing the breaded product from moving therethrough. The hopper 34 is divided by a V-shaped bottom wall 36 into elongate outlets 37 and 38. A butterfly value 39 is mounted on the upper end of the V-shaped bottom wall 36 to direct flour toward the outlet 37 or toward the outlet 38.

A housing 40 is supported on the platform 14 and the lower end of the outlet 37 is seated therein. A second housing 41 is similarly supported on the platform 14 and the outlet end 38 of the hopper 34 is seated therein. A drive motor 42 is mounted on the platform 14 in axial alignment with the housing 40 and a second drive motor 43 is mounted on the platform 14 in axial alignment with the housing 41. A valved outlet member 44 is secured to the feed chute 28 on one side thereof and a second valved outlet member 45 is secured to the opposite side of the feed chute 28 with each of the valved outlets 44, 45 being adapted to discharge into the feed chute 28. The valved outlet 45 and the valved outlet 44 are identical and the valved outlet 45 will be described in detail. The valved outlet 45 includes a cylindrical member 46 having a reduced diameter portion 47 extending downwardly therefrom. A port 48 is formed in the side of the cylindrical member 46 toward the chute 28. A second cylindrical member 49 having a port 50 formed therein is mounted for rotation on the cylindrical member 48 and is secured to a combined handle cover 50 closing the upper end of the cylindrical members 46, 49. A cover 51 extends across the inlet chute 28 and covers the upper end of the valved outlet 45 and the valved outlet 44. A flexible tubular housing 52 extends upwardly from the housings 40, 41 to the valved outlets 44, 45 respectively and a flexible screw conveyor 53 is mounted in each of the housings 52 and extends through the housings 40, 41. A shaft 54 extends from each of the motors 42, 43 to the screw conveyor 53 adjacent thereto. A quick coupling member 55 secures the housing 52 to the reduced diameter portion 47 of the valved outlet 44 and the valved outlet 45. A second quick coupler 56 secures the lower ends of the housing 52 to the housings 40, 41 respectively.

A drive motor 57 is supported on the drive motor frame 15 and drives the shafts 19 through a belt 58 and pulleys 59 and 60 to rotate the cylinder 23.

A collecting bin 61 is supported on the hopper 34 in a position to receive dough balls sifted from the flour by the screen 32 and discharged into the bin 61.

In the use and operation of the invention food stuffs to be breaded such as shrimp, chicken or fish are dropped through the inlet chute 28 and breading flour is fed into the chute 28 either through the valved outlet 44, the valved outlet 45 and added with the food stuffs. The breading flour and the food stuffs move into the hopper 23 and it is rotated so that the mixing blade 26 thoroughly mixes the food stuff and flour together so that the outer surface of the food stuff becomes completely coated with flour. The food stuff and flour move longitudinally through the cylinder 23 to the right as viewed in FIG. 3 with the food stuff being discharged from the end of the cylinder 23 onto the screen 35. Most of the flour falls through the slots 31 through the screen 32 and then through the screen 35 into the outlet ends 37 or 38 of the hopper 34 depending upon the position of the valve 39. Dough balls which tend to form in the flour due to some moisture or grease absorbed from the food stuff are caught on the screen 32 and are delivered to the bin 61 for disposition.

Since different types of breading flours are used with various recipes the automatic breading machine 10 has a pair of outlet hoppers 37, 38 and a valve 39 to permit a selection of flour to be used. One of the hoppers 37 may contain plain flour for crispy type chicken while the opposite hopper 38 may contain spiced flour. Each of the hoppers 37, 38 has its own conveyor to prevent the mixing of the flours contained therein.

The cylinder 23, screen 32, inlet chute 28, hopper 34 and convenor housing 52 may all be easily removed for complete cleaning as needed.

Having thus described the preferred embodiment of the invention it should be understood that numerous structural modifications and adaptations may be resorted to without departing from the spirit of the invention.

What is claimed is:

1. An automatic portable breading machine comprising a table, a breading cylinder horizontally mounted for horizontal rotation on said table, means on said table for rotating said breading cylinder, an inlet chute on said table positioned adjacent one end of said breading cylinder for feeding food stuff to be breaded and breading flour into said breading cylinder, an elongate mixing blade extending along the inside length of the cylinder for moving the food stuff and breading flour through the cylinder, means underlying the discharge end portion of said breading cylinder for separating the breading flour and food stuff, and a plurality of flexible housings and a flexible screw conveyor mounted in each housing with said housings detachably secured to said inlet chute and the means separating the food stuff and the breading flour.

2. A device as claimed in claim 1 including valve means controlling the flow of flour from said conveyor housings to said inlet chute.

3. A device as claimed in claim 1 wherein the means separating the food stuff from the breading flour includes a pair of hopper discharge portions, valve means controlling the flow of breading flour selectively to one of said discharge hopper portions and each of said discharge hopper portions being provided with said conveyor housing and screw conveyor.

4. A device as claimed in claim 3 including independent drive means for each of said conveyors.

5. In a device as claimed in claim 1 a truncated conical sifting screen having its smaller diameter detachably secured to the discharge end of said cylinder and its larger diameter positioned intermediate the ends of said cylinder said screen encompassing said cylinder for separating dough balls from said flour and said food stuff.

6. A device as claimed in claim 5 including a plurality of elongate slots extending longitudinally of said cylinder in radially spaced relation and covered by said screen, said slots permitting dough balls to fall from said cylinder into said truncated conical sifting screen.

* * * * *